United States Patent
Kim et al.

(10) Patent No.: US 11,248,460 B2
(45) Date of Patent: Feb. 15, 2022

(54) DETECTING A FLOOD FRONT IN A FORMATION

(71) Applicant: HALLIBURTON ENERGY SERVICES, INC., Houston, TX (US)

(72) Inventors: Joonshik Kim, Singapore (SG); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 234 days.

(21) Appl. No.: 16/468,549

(22) PCT Filed: Jan. 12, 2017

(86) PCT No.: PCT/US2017/013257
§ 371 (c)(1),
(2) Date: Jun. 11, 2019

(87) PCT Pub. No.: WO2018/132103
PCT Pub. Date: Jul. 19, 2018

(65) Prior Publication Data
US 2020/0072042 A1 Mar. 5, 2020

(51) Int. Cl.
*E21B 47/113* (2012.01)
*G01V 3/30* (2006.01)
*G01V 3/38* (2006.01)
*E21B 43/16* (2006.01)

(52) U.S. Cl.
CPC .......... *E21B 47/113* (2020.05); *E21B 43/162* (2013.01); *G01V 3/30* (2013.01); *G01V 3/38* (2013.01)

(58) Field of Classification Search
CPC ....... E21B 47/113; E21B 43/162; G01V 3/30; G01V 3/38
See application file for complete search history.

(56) References Cited

U.S. PATENT DOCUMENTS

| | | |
|---|---|---|
| 7,805,248 B2 | 9/2010 | Thigpen et al. |
| 8,700,371 B2 | 4/2014 | Thambynayagam et al. |
| 2008/0290874 A1 | 11/2008 | Seleznev et al. |
| 2011/0100632 A1 | 5/2011 | Dinariev et al. |
| 2014/0139225 A1* | 5/2014 | Mandviwala ............ G01V 3/26 324/344 |
| 2014/0191120 A1* | 7/2014 | Donderici ................ G01V 8/20 250/265 |

(Continued)

FOREIGN PATENT DOCUMENTS

WO 2016159997 A1 10/2016

OTHER PUBLICATIONS

Gong, Li Wang et al., "Triaxial Induction Tool Response In Dipping and Crossbedded Formations", SEG Denver 2014 Annual Meeting, pp. 585-590.

(Continued)

*Primary Examiner* — Tarun Sinha
*Assistant Examiner* — Lal C Mang
(74) *Attorney, Agent, or Firm* — Chamberlain Hrdlicka (57) ABSTRACT

A method of detecting a flood front through a subterranean formation, comprising, measuring a distance to the flood front, processing the measured distance using a predictor-corrector filter to determine a corrected distance to the flood front, and adjusting a formation device based on the corrected distance to control a flow of the flood front.

25 Claims, 4 Drawing Sheets

(56) References Cited

U.S. PATENT DOCUMENTS

2015/0068738 A1* 3/2015 Wayne .................... E21B 47/06
                                                                                     166/250
2016/0290124 A1* 10/2016 Chemali .................. G01V 3/10

OTHER PUBLICATIONS

International Search Report and Written Opinion dated Sep. 28, 2017 for PCT Application No. PCT/US2017/013257 filed Jan. 12, 2017 (17 pages).

\* cited by examiner

DETECTING A FLOOD FRONT IN A FORMATION

BACKGROUND

This section is intended to provide relevant background information to facilitate a better understanding of the various aspects of the described embodiments. Accordingly, it should be understood that these statements are to be read in this light and not as admissions of prior art.

During hydrocarbon production from a subterranean formation, flooding processes such as water flooding, steam flooding, and chemical flooding are implemented to improve production and extend the lifetime of a reservoir. The flooding process includes injecting a fluid into the formation, for example, to flush the hydrocarbons from a producing zone of the formation and into a wellbore. The progression of an interface of the injected fluid, i.e., flood front, is often monitored to prevent breakthrough of injected fluid at a point of reference, e.g., the producing zone of the formation or the wellbore. Fluid breakthrough occurs when a portion of the flood front reaches the point of reference so that the injected fluid commingles with the fluids at the point of reference. In some cases, an estimation model is used to detect and monitor various factors of the flood front. For instance, the estimation model can monitor a distance between the point of reference and the flood front to detect an impending breakthrough event. However, uncertainties from the estimation model may affect the accuracy of the data, thus, leading to premature breakthrough at the point of reference.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
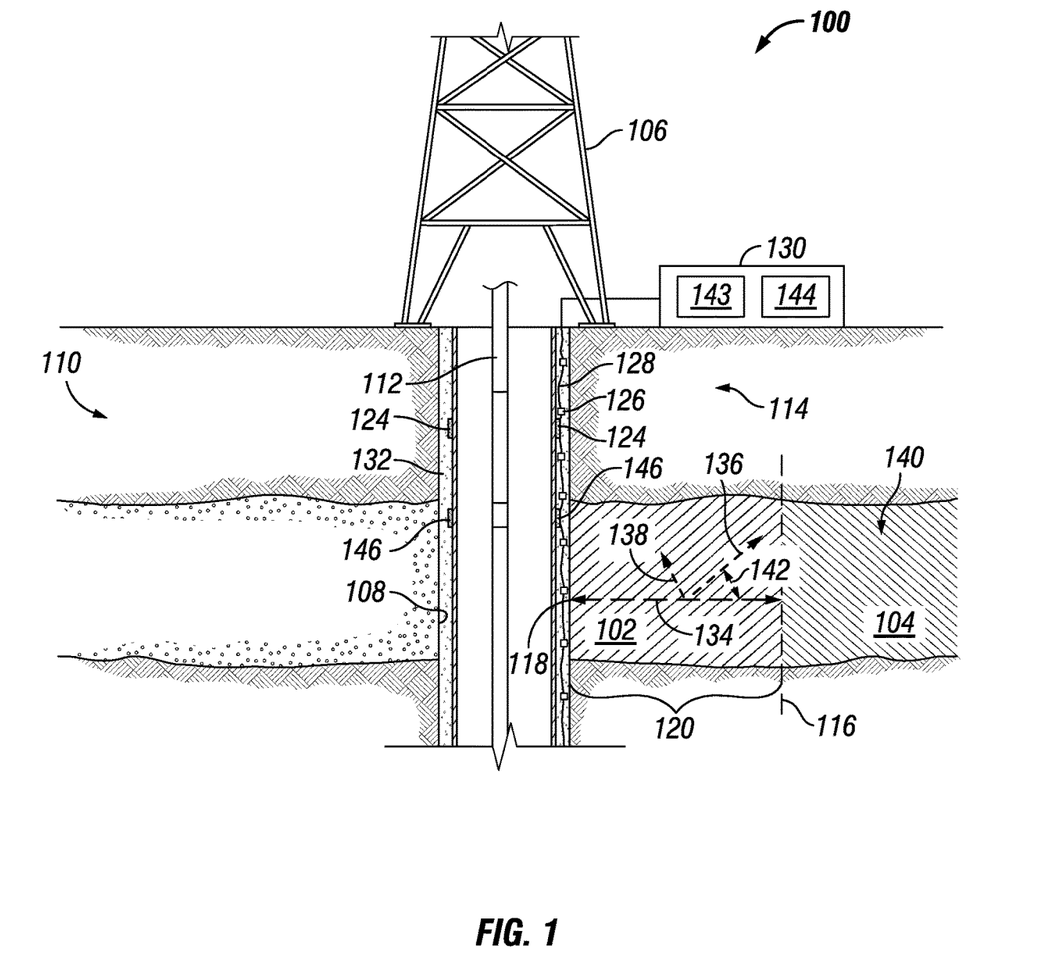
FIG. 1 is a perspective view of an example hydrocarbon environment, according to one or more embodiments.

FIG. 1 is a perspective view of an example hydrocarbon environment 100, according to one or more embodiments. The environment 100 can include various types of fluids, such as oil, water, gas, or injected chemicals. However, for clarity and ease of understanding, the environment 100 includes a formation fluid 102, such as oil, and a flood fluid 104 including water.

A service rig 106 extends over and around a wellbore 108 that penetrates a subterranean formation 110 for the purpose of recovering hydrocarbons, removing contaminants in the hydrocarbons, and the like. The service rig 106 may be one of a drilling rig, a completion rig, a work over rig, or other structure that supports a work string 112 that extends through the wellbore 108. The work string 112 can include a steel pipe, a coiled tube, or other structure used to contain fluids flowing in the wellbore 108 and to preserve the integrity of the wellbore 108. The work string 112 and wellbore 108 may further include various formation devices and equipment, for example, a flow control device 146 that control the flow of the fluids between the wellbore 108 and the formation 110.

A flooding process includes injecting the flood fluid 104, e.g., water, into the formation 110 to encourage displacement of the hydrocarbons from a production zone 120 and to maintain formation pressure, among other factors. A monitoring system 114 detects the movement of an interface, i.e. flood front 116, of the flood fluid 104 as it flows through the formation 110 and approaches the production zone 120. As described herein, the flood front 116 refers to an interface between any two fluids with different resistivities, such as the formation fluid 102 and the flood fluid 104. In other examples, the monitoring system 114 can detect other characteristics of the hydrocarbon environment 100 and thus, is not limited to the details of the example depicted in FIG. 1.

Detection of the flood front 116 before it reaches a point of reference can minimize the occurrence of a flood breakthrough. The point of reference can include the production zone 120 that contains the formation fluid 102, an external or internal area 118 of the wellbore 108, or other areas of the formation 110 that include the formation fluids 102. Flood breakthrough includes the commingling of the flood fluid 104 and other non-formation fluids with the formation fluid 102 or fluids contained within the wellbore 108. Thus, the detection of the flood front 116 before it reaches the point of reference can reduce or eliminate the chance of diluting the concentration of the formation fluid 102.

The monitoring system 114 includes downhole equipment, such as a transmitter 124, a receiver 126, and a cable 128. The location of the equipment is not limited to the disclosure of FIG. 1. Instead, the equipment can be positioned at other points within the hydrocarbon environment 100.

The transmitter 124 can be deployed into the wellbore 108 while simultaneously transmitting electromagnetic (EM) fields and gradients of the EM fields while in a stationary position in the wellbore 108. The transmitter 124 broadcasts a frequency signal that generates a current that flow through the formation 110 and the current, in turn, generates the EM fields. The EM fields include data related to the formation 110 and can propagate through the formation 110 as signal data to be recorded or received by the receiver 126.

In the embodiments, the generated EM fields interact with the flood fluid 104 so as to include data related to the characteristics and properties associated with the flood fluid 104, for instance, a distance between the flood front 116 and the point of reference. It should be understood that the signals transmitted by the transmitter 124 are not limited to flood front signal data. The EM fields can provide signal data related the resistivity, the conductivity, and other geological properties of the formation 110.

The receiver 126 receives and communicates the signal to a monitoring unit 130 via the cable 128. The monitoring unit 130 is a component of the monitoring system 114 and includes various devices such as a transducer or a waveguide to interrogate the signal. The monitoring unit 130, as shown in FIG. 1, is located above ground. In other examples, the monitoring unit 130 can be located in the wellbore 108, for example, attached to the work string 112, or in a liner 132 of the wellbore 108, such as casing or cement.

The monitoring unit 130 analyzes the signal to provide parameter data associated with the flood front 116, among other parameter data related to the hydrocarbon environment 100. The parameter data can include a measured distance to the flood front (d) 134, a horizontal resistivity of a formation fluid layer (Rch) 136, a vertical resistivity of the formation fluid layer (Rcv) 138, a resistivity of a flood fluid layer (Rw) 140, an angle of a cross bed layer containing a point of reference 142, and the like. The embodiments of the disclosure will focus on the measured distance to the flood front (d) 134 but it should be understood to apply to other types of parameter data.

The quality of the signal transmitted to the monitoring unit 130 can be affected by frequency fluctuations, random noise, and other extraneous information that interferes with or alters the signal. The monitoring unit 130 therefore may use various estimation models to reduce the interferences. However, the performance of the estimation models is also affected by the fluctuations and noise such that the parameter data includes various uncertainties and errors.

The monitoring unit 130 of the embodiments includes a processor 143 used to run the processes of a predictor-corrector filter 144, as will be described. The predictor-corrector filter 144 minimizes the uncertainties and errors in the parameter data to provide corrected parameter data. For example, the uncertainties and errors in the measured distance to the flood front (d) 134 are filtered by the predictor-corrector filter 144 to provide a corrected distance to the flood front, as will be later described in greater detail. The corrected distance to the flood front can provide greater insight into the true progression of the flood front 116 and the possible occurrence of breakthrough.

The corrected distance to the flood front may be used to adjust the position of the flow control device 146 that controls the flow of the flood front 116 as it progresses through the formation 110. For instance, when the flood front 116 is a specified distance from the production zone 120, the flow control device 146 is adjusted to a closed position to prevent breakthrough into the zone 120. Although the embodiments of the disclosure focus on a flow control device 146, it should be understood that other devices used to control and regulate the flood front 116 are applicable.

The monitoring system 114 may monitor other characteristics of the formation 110 and thus, the scope of the disclosure is not limited to the details described with respect to FIG. 1. It should be further understood that the monitoring system 114, including the transmitter 124, the sensor 126, the optical cable 128, and the monitoring unit 130 are not limited to the disclosure but alterations and modifications can occur. Additional equipment and devices may also be present in the environment 100 including, but not limited to, compressors, pressure controllers, pressure sensors, flow rate controllers, flow rate sensors, temperature sensors, and the like.

Figure 2:
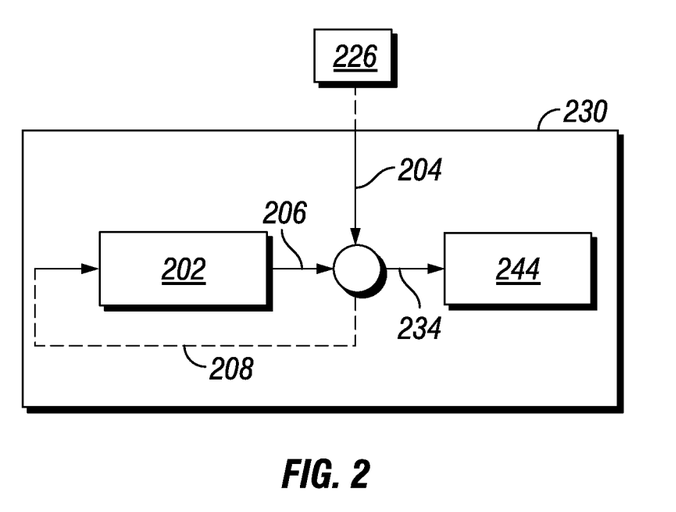
FIG. 2 is a block diagram of an example observation model used in a predictor-corrector filter, according to one or more embodiments.

FIG. 2 is a block diagram of an example observation model 202 used in a predictor-corrector filter 244, according to one or more embodiments. A receiver 226 transmits a signal 204 related to an observed distance to a flood front to a monitoring unit 230. The signal 204 may be affected by frequency fluctuations, random noise, and other extraneous information that interferes with or alters the signal 204. Thus, the signal 204, when processed, may provide erroneous data. The observation model 202 matches the signal 204 with a modeled signal 206 to correct the erroneous data and to provide a measured distance to the flood front 234. The signal 204 and the modeled signal 206 can include data related to the characteristics and properties of a formation, such as formation fluid data, wellbore fluid data, and so forth.

The modeled signal 206 is generated based on modeled data as a function of time and frequency. The modeled signal 206 inputted into the observation model 202 can include a modeled distance to the flood front, a modeled horizontal resistivity of a formation fluid layer, a modeled vertical resistivity of the formation fluid layer, a modeled resistivity of a flood layer, and a modeled angle of a cross bed layer containing a point of reference. Other modeled data signals related to the formation 110, such as permittivity, porosity, and permeability, can be inputted into the observation model 202 depending on the parameter data desired.

The observation model 202 calculates the best match between the signal 204 and the modeled signal 206 using the following equation:

$$z = Hd + v \qquad \text{Equation 1}$$

where z is the measured distance to the flood front 234, H is an observation matrix, d is at least one of a previous, current, or future true distance to the flood front, and v is a random variable vector that models the uncertainty of the z, measured distance to the flood front 234. In some cases, the previous distance to the flood front can be used as a constraint or an initial estimate when matching the signal 204 with the modeled signal 206. The observation model 202 may be an inversion loop model that uses parameter fitting techniques to calculate the measured distance to the flood front 234. In particular, the signal 204 and the modeled signal 206 are processed in a continuous loop 208 until an absolute difference between an estimated measured distance to the flood front and the measured distance to the flood front 234 is less than a threshold value.

Since the signal 204 and the modeled signal 206 originate and are transmitted over multiple channels in close proximity to noise-generating components in a downhole environment, the measured distance to the flood front 234 may be less than accurate due to uncertainties in the measurement. Therefore, the measured distance 234 is feed into the predictor-corrector filter 244 to filter uncertainties and process noise.

Figure 3:
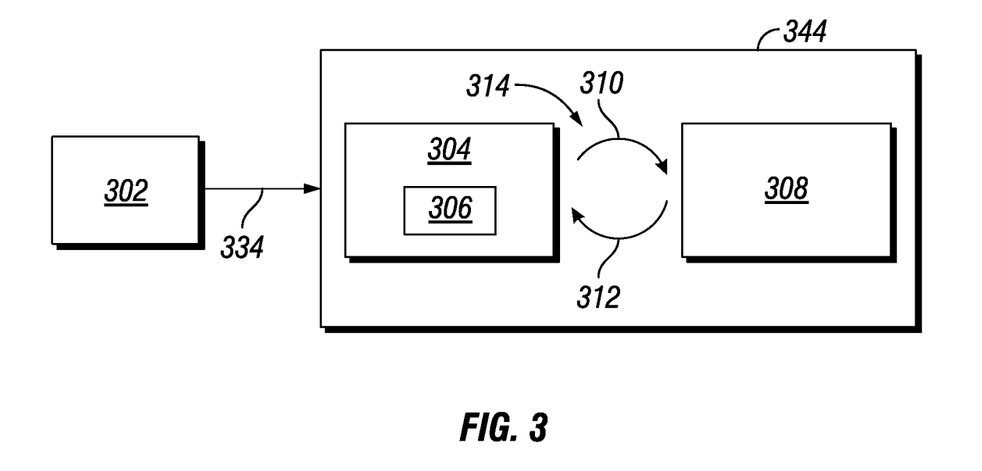
FIG. 3 is a block diagram of an example predictor-corrector filter, according to one or more embodiments.

FIG. 3 is a block diagram of an example predictor-corrector filter, according to one or more embodiments. A measured distance to a flood front 334, as determined by an observation model 302, contains observation uncertainties that affect the accuracy of the measurement. The uncertainties may be the result of repeated measurements, formation properties, and noise generated by near-by equipment and devices, among other factors. A predictor-corrector filter 344 of the embodiments can filter these and other uncertainties using a two-stage system including a predictor stage 304 and a corrector stage 308. In the embodiments, it should be understood that the processes of the predictor-corrector filter

344 can be computed using a processor, as described with respect to FIG. 1, or other forms of computationally hardware and/or software.

The predictor stage 304 uses a state space model, such as a simplified dynamic model 306, to calculate a predicated distance to a flood front 310. The measured distance to the flood front 334 is initially feed into the predictor stage 304 as a starting point for successive iterations, along with a velocity measurement of the flood front. The measured distance to the flood front 334 and the velocity measurement of the flood front provide insight into the dynamics of the flood front, i.e. the behavior and movement of the flood front. In some cases, parameter data at deeper depths in the formation may be needed. In this case, the velocity parameter is constrained based on the flood front movement data, dynamic reservoir data, or other dynamic data to determine parameter data at deeper formation depths. As described herein, the constrained velocity parameter includes a velocity that is adjusted to a value between its observed value and another value from a different information source. For example, the constrained velocity parameter includes application of a lower bound or upper bound, which limits the velocity to be higher than the lower bound, and lower than the upper bound.

The measured distance to a flood front (d) 334 and the velocity measurement of the flood front (v) are represented by a current state vector, including $x=[d\ v]^T$ where T defines a time step. Using the simplified dynamic model 306, the current state vector calculates a next (predicted) state vector, $\hat{x}=[d\ v]^T$, including the predicted distance to the flood front ($\hat{d}$) 310 and a predicted velocity of the flood front ($\hat{v}$). The next state vector is represented as follows:

$$\hat{x}(t+T)=Ax(t)+w$$

$$\hat{P}=APA^T+Q$$

where,
x=state vector, where x is distance (d) or velocity (v)
t=time
T=time step
A=state transition matrix
w=random noise vector/process uncertainty
P=error covariance matrix
Q=covariance matrix Accordingly, the symbol ^ represents the next state vector, i.e., the predicted distance to the flood front 310 ($\hat{d}$), and contains a priori information related to the next distance measurement.

The simplified dynamic model 306 used to determine the current state vector, $x=[d\ v]^T$, and the next (predicted) state vector, $\hat{x}=[d\ v]^T$, is represented by Equation 2.

$$\begin{bmatrix} d(t+T) \\ v(t+T) \end{bmatrix} = \begin{bmatrix} 1 & T \\ 0 & 1 \end{bmatrix} \begin{bmatrix} d(t) \\ v(t) \end{bmatrix} + a \begin{bmatrix} T^2/2 \\ T \end{bmatrix} \quad \text{Equation 2}$$

Equation 2 is derived from a truncated Taylor expansion of the distance function, d(t), which is a follows:

$$d(t)=d(t_0)+\dot{d}(t_0)(t-t_0)+\tfrac{1}{2}\ddot{d}(t_0)(t-t_0)^2$$

$$v(t)=v(t_0)+\dot{v}(t_0)(t-t_0)$$

$$\dot{d}(t_0)=v(t_0)$$

$$\ddot{d}(t_0)=a(t_0)$$

The velocity (v(t)) is a function of the permeability (k) of the flood front and can be derived using Darcy's law. Without a driving force term in Equation 2 (e.g., pressure in a formation), the acceleration (a) is a random variable that acts like random noise and models the uncertainties related to the predicted distance to the flood front ($\hat{d}$) 310.

A margin of error for the predicated distance to the flood front ($\hat{d}$) 310 can be generated at the predictor stage 304 and used to indicate the quality of the corrections provided by the predictor-corrector filter 344. In some examples, the margin of error for the predicted distance to the flood front 310 ($\hat{d}$) is used to optimize the frequency of operation and power levels of the predictor-corrector filter 344.

The predicted distance to the flood front ($\hat{d}$) 310 is received at the corrector stage 308. The accuracy of the predicted distance to the flood front ($\hat{d}$) 310 is often affected by the dynamic behavior of the flood front, for example, process and acceleration disturbances. A gain (K) is calculated at the corrector stage 308 and used to filter the predicted distance to the flood front ($\hat{d}$) 310 and to determine a corrected state vector, i.e., a corrected distance to the flood front (d) 312. Thus, the predictor-corrector filter 344 filters and/or corrects the uncertainty in the predicted distance to the flood front ($\hat{d}$) 310 to provide the corrected distance to the flood front (d) 312. The predicted error covariance matrix ($\hat{P}$) can be also corrected at the corrector stage 308. The predicted distance to the flood front 310 ($\hat{d}$) and the predicted error covariance matrix ($\hat{P}$) are represented as follows:

$$\hat{d}(t+T)=Ad+w$$

$$\hat{P}=APA^T+Q$$

The gain (K), the corrected distance to the flood front 312 (d), and the corrected error covariance matrix (P) are represented as follows:

$$K=\hat{P}H^T(H\hat{P}H^T+R)^{-1}$$

$$d=\hat{d}+K(z-H\hat{d})$$

$$P=(I-KH)\hat{P}$$

A margin of error for the corrected distance to the flood front 312 (d) and the corrected error covariance matrix (P) can be generated at the corrector stage 308. In some examples, the margin of error for the corrected distance to the flood front 312 (d) is used to optimize the frequency of operation and power levels of the predictor-corrector filter 344.

The predictor-corrector filter 344 uses a recursive loop technique loop 314 to correct the predicted distance to the flood front ($\hat{d}$) 310 and the corrected distance to the flood front 312 (d). Specifically, as new measurements for the measured distance to the flood front 334 are inputted into the predictor-corrector filter 344, the previous predicted distances to the flood front 310 ($\hat{d}$) and the previous corrected distances to the flood front 312 (d) are continuously filter over a sequence of time. In some cases, the measured distance to the flood front 334 bypasses the predictor stage 304 and is inputted into the corrector stage 308 to filter the observation uncertainties.

The observation model 302 and the dynamic model 306 calculate the measured distance to the flood front 334 and the predicted distance to the flood front 310, respectively. However, the observation model 302 generates observation uncertainties (e.g., noise levels) and the dynamic model 306 generates predicted uncertainties (e.g., process/acceleration disturbances) that affect the accuracy of the distance measurements. In the embodiments, the predictor-corrector filter 344 is combined with the observation model 306 and the dynamic model 306 to correct the uncertainties. In particular, the predictor-corrector filter 344 uses the uncertainties as random variables to calculate the gain (K), which corrects the distance measurements. The predictor-corrector filter 344 may be a Kalman filter or any other type of estimator filter to correct parameter data of interest, which is subjected to indirect, inaccurate, and uncertain observations as a result of interfering factors. It should be understood that other types of estimation models other than an observation model and a dynamic model could be used to correct and filter the measured and predicted distance measurements.

In the embodiments, predictor-corrector filter 344 can process a series of measurements related to a variable that contains noise and other uncertainties by calculating a more accurate measurement than a single measurement alone. The uncertainties can include observation uncertainties and dynamic uncertainties that can be modeled by a Gaussian distribution, as shown in FIGS. 4-6.

Figure 4:
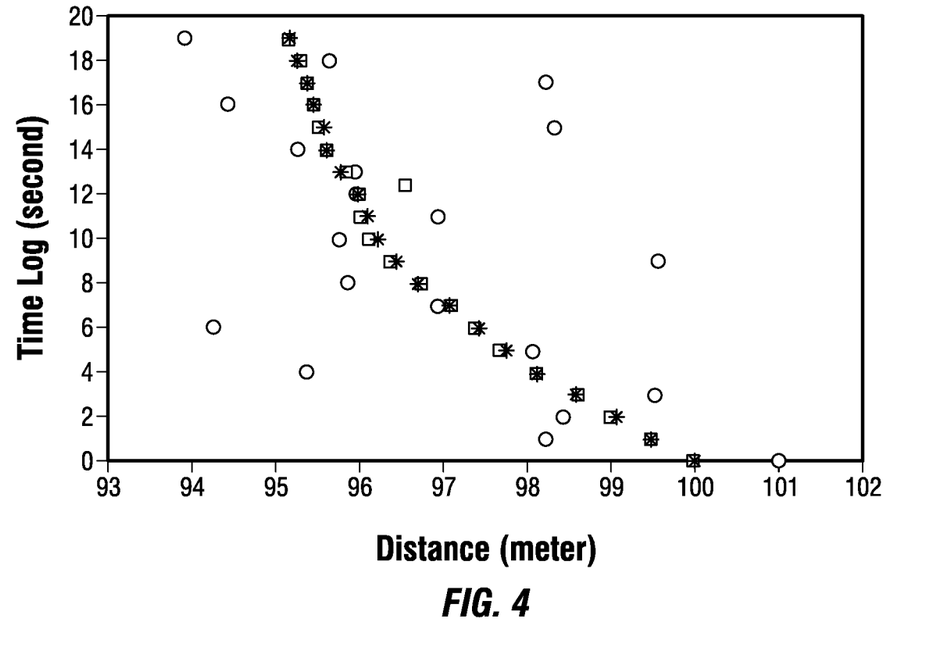
FIG. 4 is a graph illustrating a predictor-corrector filter correction for a distance measurement with observed uncertainties greater than dynamic uncertainties, according to one or more embodiments.

FIG. 4 is a graph illustrating a predictor-corrector filter correction for a distance measurement with observed uncertainties greater than dynamic uncertainties, according to one or more embodiments. In particular, the graph of FIG. 4 depicts changes in the distance to a flood front, measured in meters, over a period of time, measured in seconds.

An observation model uses a random variable vector (v) to model the observation uncertainties for a measured distance to a flood front. The observation uncertainties include a standard deviation value of $\sigma_v=2.0$ for the random variable vector. A dynamic model uses a random noise vector (w) to model the dynamic uncertainties for a predicted distance to a flood front. The dynamic uncertainties includes a standard deviation value of $\sigma_w=0.1$ for the random noise vector. As shown in FIG. 4, observed distances to a flood front, as represented by ○, are randomly scattered due to observed uncertainties and thus, provide less than accurate distance measurements. Predicted distances to a flood front, as represented by show minimal dynamic uncertainties and thus, provide a closer match to true distances to the flood front, as represented by x. The predictor-corrector filter filters the minimal uncertainties from the predicted distances to the flood front to provide the corrected distances to the flood front, as represented by +. In the example of FIG. 4, the predictor-corrector filter relies more on the dynamic model since the observed uncertainties are greater than dynamic uncertainties.

Figure 5:
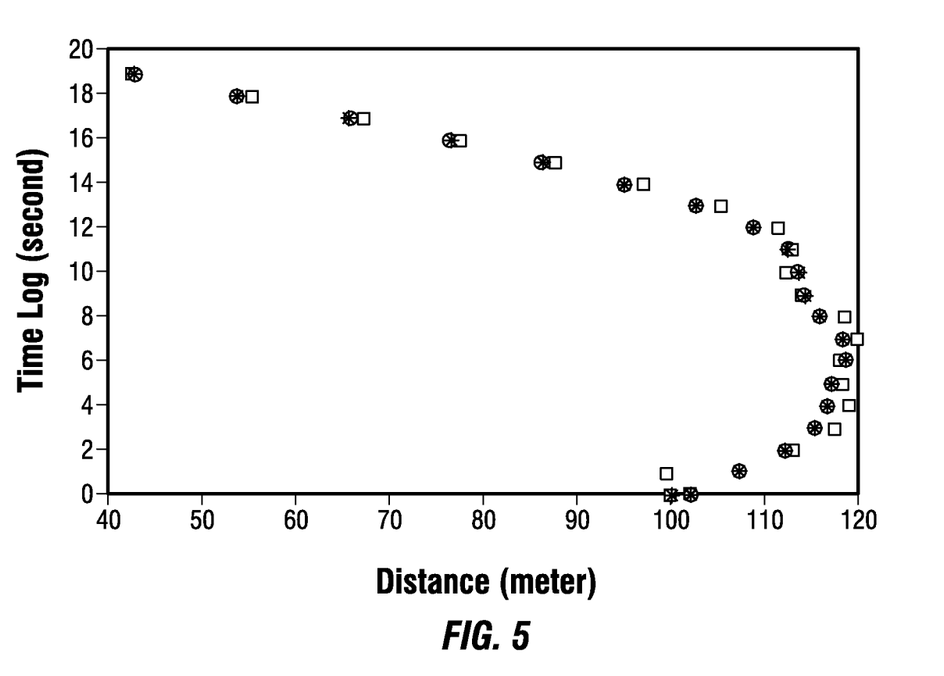
FIG. 5 is a graph illustrating a predictor-corrector filter correction for a distance measurement with dynamic uncertainties greater than observation uncertainties, according to one or more embodiments.
Figure 6:
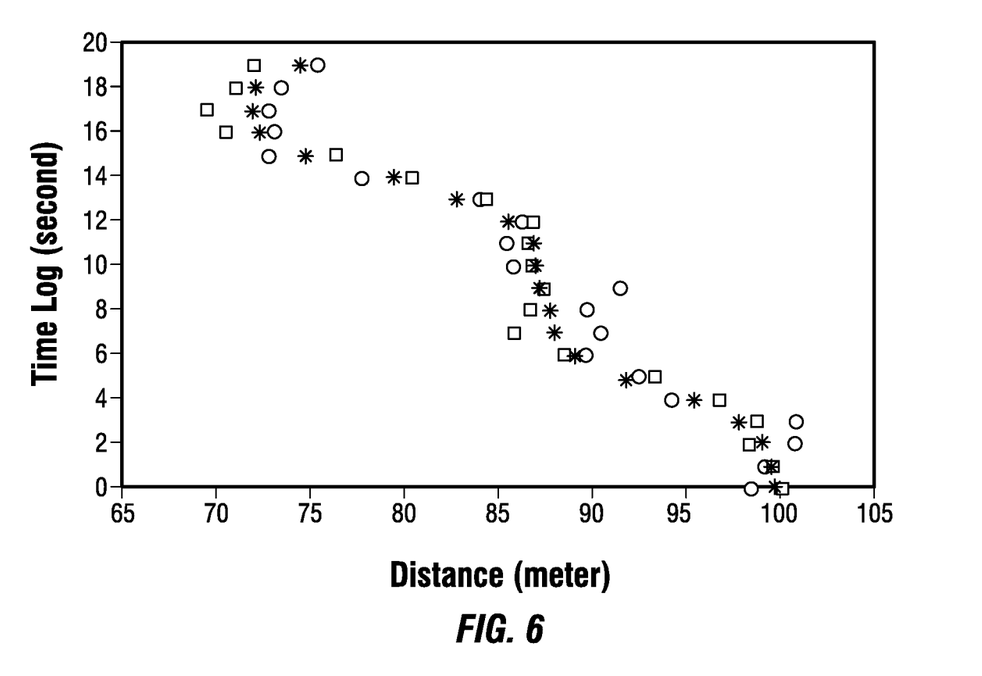
FIG. 6 is a graph illustrating a predictor-corrector filter correction for a distance measurement with equal observed uncertainties dynamic uncertainties, according to one or more embodiments.

FIG. 5 is a graph illustrating a predictor-corrector filter correction for a distance measurement with dynamic uncertainties greater than observation uncertainties, according to one or more embodiments. The graph of FIG. 5 depicts changes in the distance to a flood front, measured in meters, over a period of time, measured in seconds.

An observation model uses a random variable vector (v) to model the observation uncertainties for measured distances to a flood front, as represented by ○. The observation uncertainties include a standard deviation value of $\sigma_v=0.1$ for the random variable vector. A dynamic model uses a random noise vector (w) to model the dynamic uncertainties for a measured distance to a flood front. The dynamic uncertainties includes a standard deviation value of $\sigma_w=2.0$ for the random noise vector. The predictor-corrector filter is more dependent on the observation model in correcting predicted distances to the flood front, as represented by □, since the dynamic uncertainties are greater than the observation uncertainties. As shown in FIG. 5, the corrected distances to the flood front, as represented by +, closely match the true distances to the flood front, as represented by x, after using the predictor-corrector filter.

FIG. 6 is a graph illustrating a predictor-corrector filter correction for a distance measurement with equal observed uncertainties dynamic uncertainties, according to one or more embodiments. The graph of FIG. 6 depicts changes in the distance to a flood front, measured in meters, over a period of time, measured in seconds.

An observation model uses a random variable vector (v) to model the observation uncertainties for measured distances to a flood front, as represented by ○. The observation uncertainties include a standard deviation value of $\sigma_v=2.0$ for the random variable vector. A dynamic model uses a random noise vector (w) to model the dynamic uncertainties (i.e., acceleration/process uncertainties) for a measured distance to a flood front. The dynamic uncertainties includes a standard deviation value of $\sigma_w=2.0$ for the random noise vector. To correct predicted distances to the flood front, as represented by □, and provide corrected distances to the flood front, as represented by +, the predictor-corrector filter relies equally on both the dynamic model and the observation model to correct the observed uncertainties and dynamic uncertainties. As shown in FIG. 6, the corrected distances to the flood front, +, closely match the true distances to the flood front, as represented by x, after using the predictor-corrector filter.

Accordingly, predictor-corrector filter uses observation and dynamic models to calculate and provide flood front data that is more aligned with the true values for the flood front data Compared to flood front data calculated using the observation or dynamic models alone, the predictor-corrector filter of the embodiments improves the signal-to-noise by a factor of 10 and a depth of investigation by a factor of about 3 to provide a closer match with the true distances to the flood front.

In addition, to the embodiments described above, other examples of specific combinations are within the scope of the disclosure, some of which are detailed below:

Example 1

A method of detecting a flood front through a subterranean formation, comprising, measuring a distance to the flood front, processing the measured distance using a predictor-corrector filter to determine a corrected distance to the flood front, and adjusting a formation device based on the corrected distance to control a flow of the flood front.

Example 2

The method of Example 1, wherein the formation device comprises a device configured to control a flow rate of the flood front through the formation.

Example 3

The method of Example 1, further comprising, transmitting an electromagnetic field from a transmitter to interact with the flood front to create a signal, receiving the signal at a receiver, and wherein the signal comprises an observed distance to the flood front.

Example 4

The method of Example 3, further comprising matching the signal with a modeled signal to determine the measured distance to the flood front.

Example 5

The method of Example 4, further comprising using a previous observed distance to the flood front as a constraint or an initial estimate when matching the signal with the modeled signal.

Example 6

The method of Example 3, further comprising simultaneously deploying the transmitter to a downhole environment while transmitting the electromagnetic field from the transmitter.

Example 7

The method of Example 3, further comprising, deploying the receiver to a downhole environment, and receiving the signal while the receiver is in the downhole environment.

Example 8

The method of Example 3, further comprising deploying a fiber and a transducer to a downhole environment, wherein the fiber is coupled to the transducer, and the transducer is coupled to the receiver.

Example 9

The method of Example 1, further comprising, configuring a predictor stage of the predictor-corrector filter with a distance parameter related to the flood front and a velocity parameter related to the flood front, and wherein the predictor stage is configured to receive the measured distance to the flood front.

Example 10

The method of Example 1, further comprising configuring a corrector stage of the predictor-corrector filter with a noise parameter related to the flood front.

Example 11

The method of Example 1, further comprising, processing the measured distance at a predictor stage of the predictor-corrector filter to determine a predicted distance, processing the predicted distance at a corrector stage of the predictor-corrector filter to determine the corrected distance, and continuously processing the predicted distance at the corrector stage and the corrected distance at the predictor stage over a sequence of time.

Example 12

The method of Example 1, further comprising processing the measured distance at a corrector stage of the predictor-corrector filter to determine the corrected distance.

Example 13

The method of Example 11, further comprising inputting a distance parameter related to the flood front and a velocity parameter related to the flood front into a state space model at the predictor stage to determine the predicted distance.

Example 14

The method of Example 13, further comprising constraining the velocity parameter related to the flood front using flood front movement data or dynamic reservoir data.

Example 15

The method of Example 1, further comprising generating a margin of error for the corrected distance at a corrector stage of the predictor-corrector filter.

Example 16

The method of Example 11, further comprising, generating a margin of error for the predicated distance at the predictor stage, and visualizing the margin of error as a quality indicator for the predictor-corrector filter.

Example 17

The method of Example 1, further comprising optimizing a frequency of operation and a transmitter power level for the predictor-corrector filter based on a margin of error for the corrected distance.

Example 18

The method of Example 11, further comprising optimizing a frequency of operation and a transmitter power level for the predictor-corrector filter based on the margin of error for the predicted distance to the flood front.

Example 19

A method of producing hydrocarbons from a subterranean formation, comprising, injecting a fluid into a wellbore to stimulate the formation, detecting a flood front of the fluid flowing through the formation, determining a measured distance between the flood front and a point of reference located within the formation, processing the measured distance using a predictor-corrector filter to determine a corrected distance between the flood front and the point of reference, adjusting a formation device based on the corrected distance to control a flow of the flood front, and wherein the formation device is adjustable to prevent the flood front from reaching the point of reference during production of the hydrocarbons.

Example 20

The method of Example 19, further comprising, processing the measured distance at a predictor stage of the predictor-corrector filter to determine a predicted distance, processing the predicted distance at a corrector stage of the predictor-corrector filter to determine the corrected distance, and continuously processing the predicted distance at the corrector stage and the corrected distance at the predictor stage over a sequence of time.

Example 21

The method of Example 19, wherein the point of reference comprises a production zone or a wellbore.

Example 22

A system for detecting a flood front through a subterranean formation, comprising, a measurement system configured to measure a distance to the flood front, a processor configured to run a predictor-corrector filter to determine a corrected distance to the flood front based on the measured distance, and a formation device configured to be adjustable by the processor based on the corrected distance so as to regulate a flow of the flood front through the formation.

Example 23

The system of Example 22, wherein the processor is configured to process the measured distance to determine a predicted distance, to process the predicted distance to determine the corrected distance, and to continuously process the predicted distance and the corrected distance over a sequence of time.

Example 24

The system of Example 23, wherein the processor is configured to restrain a velocity parameter using flood movement data or dynamic reservoir data when determining the predicted distance to the flood front.

Example 25

The system of Example 22, wherein the processor is configured to determine the corrected distance based on a predicted distance to a flood front or the measured distance to the flood front.

Example 26

The system of Example 22, wherein the measurement system is configured to match a signal received by the system with a modeled signal when determining the measured distance to the flood front.

Example 27

The system of Example 26, wherein a parameter of the modeled signal comprises a modeled distance to a flood front, a resistivity of a formation layer, and a resistivity of a flood layer.

Example 28

The system of Example 22, wherein the predictor-corrector filter comprises a Kalman filter.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method of controlling a flow rate of a flood front through a subterranean formation, comprising:
    measuring a distance to the flood front using a sensor;
    processing, the measured distance and inputting a distance parameter related to the flood front and a velocity parameter related to the flood front into a state space model at a predictor stage of a predictor-corrector filter to determine a predicted distance;
    processing the measured distance and the predicted distance using the predictor-corrector filter to determine a corrected distance to the flood front; and
    adjusting a flow control device to control a flow rate of the flood front through the formation based on the corrected distance to control a flow of the flood front through the formation and prevent the flood front from reaching the point of reference.

2. The method of claim 1, further comprising:
    transmitting an electromagnetic field from a transmitter to interact with the flood front to create a signal;
    receiving the signal at a receiver; and
    wherein the signal comprises an observed distance to the flood front.

3. The method of claim 2, further comprising matching the signal with a modeled signal to determine the measured distance to the flood front.

4. The method of claim 3, further comprising using a previous observed distance to the flood front as a constraint or an initial estimate when matching the signal with the modeled signal.

5. The method of claim 2, further comprising simultaneously deploying the transmitter to a downhole environment while transmitting the electromagnetic field from the transmitter.

6. The method of claim 2, further comprising:
deploying the receiver to a downhole environment; and
receiving the signal while the receiver is in the downhole environment.

7. The method of claim 2, further comprising deploying a fiber and a transducer to a downhole environment, wherein the fiber is coupled to the transducer, and the transducer is coupled to the receiver.

8. The method of claim 1, further comprising:
configuring a predictor stage of the predictor-corrector filter with a distance parameter related to the flood front and a velocity parameter related to the flood front; and
wherein the predictor stage is configured to receive the measured distance to the flood front.

9. The method of claim 1, further comprising configuring a corrector stage of the predictor-corrector filter with a noise parameter related to the flood front.

10. The method of claim 1, further comprising:
processing the predicted distance at a corrector stage of the predictor-corrector filter to determine the corrected distance; and
continuously processing the predicted distance at the corrector stage and the corrected distance at the predictor stage over a sequence of time.

11. The method of claim 1, further comprising processing the measured distance at a corrector stage of the predictor-corrector filter to determine the corrected distance.

12. The method of claim 1, further comprising constraining the velocity parameter related to the flood front using flood front movement data or dynamic reservoir data.

13. The method of claim 1, further comprising generating a margin of error for the corrected distance at a corrector stage of the predictor-corrector filter.

14. The method of claim 10, further comprising:
generating a margin of error for the predicated distance at the predictor stage; and
visualizing the margin of error as a quality indicator for the predictor-corrector filter.

15. The method of claim 1, further comprising optimizing a frequency of operation and a transmitter power level for the predictor-corrector filter based on a margin of error for the corrected distance.

16. The method of claim 10, further comprising optimizing a frequency of operation and a transmitter power level for the predictor-corrector filter based on the margin of error for the predicted distance to the flood front.

17. A method of producing hydrocarbons from a subterranean formation, comprising:
injecting a fluid into a wellbore to stimulate the formation;
detecting a flood front of the fluid flowing through the formation;
determining a measured distance between the flood front and a point of reference located within the formation;
processing the measured distance and inputting a distance parameter related to the flood front and a velocity parameter related to the flood front into a state space model at a predictor stage of a predictor-corrector filter to determine a predicted distance;
processing the measured distance and the predicted distance using a predictor-corrector filter to determine a corrected distance between the flood front and the point of reference;
adjusting a flow control device to control a flow rate of the flood front through the formation based on the corrected distance to control a flow of the flood front; and
wherein the flow control device is adjustable to prevent the flood front from reaching the point of reference during production of the hydrocarbons.

18. The method of claim 17, further comprising;
processing the measured distance at a predictor stage of the predictor-corrector filter to determine a predicted distance;
processing the predicted distance at a corrector stage of the predictor-corrector filter to determine the corrected distance; and
continuously processing the predicted distance at the corrector stage and the corrected distance at the predictor stage over a sequence of time.

19. The method of claim 17, wherein the point of reference comprises a production zone or a wellbore.

20. A system for controlling a flow rate of a flood front through a subterranean formation, comprising:
a measurement system configured to measure a distance to the flood front;
a processor configured to run a predictor-corrector filter to determine a predicted distance to the flood front and a corrected distance to the flood front based on the measured distance and to restrain a velocity parameter using flood movement data or dynamic reservoir data when determining the predicted distance to the flood front; and
a flow control device configured to be adjustable by the processor to control a flow rate of the flood front through the formation based on the corrected distance to regulate a flow of the flood front through the formation and prevent the flood front from reaching the point of reference.

21. The system of claim 20, wherein the processor is configured to process the predicted distance to determine the corrected distance and to continuously process the predicted distance and the corrected distance over a sequence of time.

22. The system of claim 20, wherein the processor is configured to determine the corrected distance based on the predicted distance to the flood front or the measured distance to the flood front.

23. The system of claim 20, wherein the measurement system is configured to match a signal received by the system with a modeled signal when determining the measured distance to the flood front.

24. The system of claim 23, wherein a parameter of the modeled signal comprises a modeled distance to a flood front, a resistivity of a formation layer, and a resistivity of a flood layer.

25. The system of claim 20, wherein the predictor-corrector filter comprises a Kalman filter.

* * * * *